United States Patent
Shakil

(10) Patent No.: US 12,452,126 B2
(45) Date of Patent: Oct. 21, 2025

(54) PROVISIONING FLOW TROUBLESHOOTING TOOL

(71) Applicant: T-Mobile USA, Inc., Bellevue, WA (US)

(72) Inventor: Adnan Shakil, Plano, TX (US)

(73) Assignee: T-Mobile USA, Inc., Bellevue, WA (US)

( * ) Notice: Subject to any disclaimer, the term of this patent is extended or adjusted under 35 U.S.C. 154(b) by 72 days.

(21) Appl. No.: 18/440,725

(22) Filed: Feb. 13, 2024

(65) Prior Publication Data

US 2025/0260614 A1    Aug. 14, 2025

(51) Int. Cl.
*H04L 41/0677*    (2022.01)
*G06F 40/151*    (2020.01)
*G06F 40/284*    (2020.01)

(52) U.S. Cl.
CPC ........ *H04L 41/0677* (2013.01); *G06F 40/151* (2020.01); *G06F 40/284* (2020.01)

(58) Field of Classification Search
None
See application file for complete search history.

(56) References Cited

U.S. PATENT DOCUMENTS

| | | |
|---|---|---|
| 5,721,827 A | 2/1998 | Logan et al. |
| 7,233,790 B2 | 6/2007 | Kjellberg et al. |
| 7,400,712 B2 | 7/2008 | August |
| 7,640,006 B2 | 12/2009 | Portman et al. |
| 8,363,789 B2 | 1/2013 | Hart et al. |
| 8,560,731 B2 | 10/2013 | Wu |
| 9,240,016 B2 | 1/2016 | Cronin et al. |
| 9,641,956 B2 | 5/2017 | Fong |
| 10,372,821 B2 | 8/2019 | Chang et al. |
| 10,687,204 B1 | 6/2020 | Roy et al. |
| 10,713,519 B2 | 7/2020 | Bui et al. |
| 11,074,598 B1 | 7/2021 | Kumar et al. |
| 11,271,796 B2 | 3/2022 | Tapia et al. |
| 11,423,911 B1 | 8/2022 | Fu et al. |

(Continued)

FOREIGN PATENT DOCUMENTS

| | | |
|---|---|---|
| CN | 1596405 A | 3/2005 |
| CN | 1620801 A | 5/2005 |

(Continued)

*Primary Examiner* — Sandarva Khanal
(74) *Attorney, Agent, or Firm* — Perkins Coie LLP

(57) ABSTRACT

The system receives an indication of a failed subscriber segment of an affected subscriber. A subscriber segment has a provisioning flow order that determines an order in which the services subscribed to by the affected subscriber are provisioned. The failed subscriber segment includes an error in the provisioning flow. The system cleans the coded text of the provisioning flow. Cleaning the coded text of the provisioning flow includes removing predetermined unnecessary characters and transforming the coded text such that the transformed coded text is configured to be inputted into a large language model (LLM). The system inputs the transformed coded text of the provisioning flow into the LLM. The system receives, as an output of the LLM, a root cause analysis of the failed subscriber segment. The root cause analysis determines the error in the provisioning flow order of the failed subscriber segment and identifies the affected subscriber.

20 Claims, 5 Drawing Sheets

(56) References Cited

U.S. PATENT DOCUMENTS

| | | |
|---|---|---|
| 11,445,374 B2 | 9/2022 | Uy et al. |
| 11,630,755 B2 | 4/2023 | Kußmaul et al. |
| 11,769,111 B2 | 9/2023 | Bui et al. |
| 2002/0165936 A1 | 11/2002 | Alston et al. |
| 2002/0168054 A1 | 11/2002 | Klos et al. |
| 2003/0208754 A1 | 11/2003 | Sridhar et al. |
| 2004/0261114 A1 | 12/2004 | Addington et al. |
| 2006/0015617 A1 | 1/2006 | Castro et al. |
| 2006/0140369 A1 | 6/2006 | Altmann et al. |
| 2007/0053292 A1 | 3/2007 | Depaul et al. |
| 2008/0049920 A1 * | 2/2008 | Napoleoni ............ H04L 65/611 379/201.12 |
| 2008/0070548 A1 | 3/2008 | Cha et al. |
| 2009/0019352 A1 | 1/2009 | Afshar et al. |
| 2010/0262446 A1 * | 10/2010 | Sticker ................. H04L 45/124 709/227 |
| 2010/0312612 A1 | 12/2010 | Carr et al. |
| 2011/0151843 A1 | 6/2011 | Deuel et al. |
| 2014/0075239 A1 * | 3/2014 | Prathipati ............ G06F 11/3692 714/4.1 |
| 2015/0220873 A1 * | 8/2015 | Shaphy .......... G06Q 10/063114 705/7.15 |
| 2015/0229475 A1 * | 8/2015 | Benoit ................ H04W 12/069 713/168 |
| 2017/0295448 A1 * | 10/2017 | McCann ............... H04W 12/04 |
| 2019/0165988 A1 * | 5/2019 | Wang ................... H04L 41/065 |
| 2021/0297933 A1 * | 9/2021 | Obaidi .................. H04W 24/02 |
| 2022/0345489 A1 | 10/2022 | Karabey et al. |
| 2023/0208875 A1 | 6/2023 | Do et al. |
| 2023/0259705 A1 | 8/2023 | Tunstall-pedoe et al. |
| 2023/0262433 A1 | 8/2023 | Potluri et al. |
| 2023/0274086 A1 | 8/2023 | Tunstall-pedoe et al. |
| 2023/0274089 A1 | 8/2023 | Tunstall-pedoe et al. |
| 2023/0274094 A1 | 8/2023 | Tunstall-pedoe et al. |
| 2023/0316006 A1 | 10/2023 | Tunstall-pedoe et al. |
| 2023/0342555 A1 | 10/2023 | Kieser et al. |
| 2024/0330589 A1 * | 10/2024 | Kotaru ................. G06F 40/205 |
| 2024/0394291 A1 * | 11/2024 | Nelson .................. G06F 40/30 |
| 2024/0428082 A1 * | 12/2024 | Wang ..................... G06N 20/00 |
| 2025/0088946 A1 * | 3/2025 | Grida Ben Yahya ... H04L 41/16 |
| 2025/0190861 A1 * | 6/2025 | Sun ........................ G06N 20/00 |

FOREIGN PATENT DOCUMENTS

| | | | |
|---|---|---|---|
| CN | 1886768 A | 12/2006 | |
| CN | 1906560 A | 1/2007 | |
| CN | 101006695 A | 7/2007 | |
| CN | 101449569 A | 6/2009 | |
| CN | 1669272 B | 9/2010 | |
| CN | 102562162 B | 5/2014 | |
| CN | 103458033 B | 5/2016 | |
| CN | 103944924 B | 4/2017 | |
| CN | 104021216 B | 5/2017 | |
| CN | 110010124 A | 7/2019 | |
| CN | 110110872 A | 8/2019 | |
| CN | 105190628 B | 10/2019 | |
| CN | 106102038 B | 2/2020 | |
| CN | 111010691 A | 4/2020 | |
| CN | 105376087 B | 7/2020 | |
| CN | 106714139 B | 7/2020 | |
| CN | 105682075 B | 8/2020 | |
| CN | 107431629 B | 1/2021 | |
| CN | 107005836 B | 2/2021 | |
| CN | 108886683 B | 3/2021 | |
| CN | 112506743 A | 3/2021 | |
| CN | 107113531 B | 6/2021 | |
| CN | 113519141 A | 10/2021 | |
| CN | 110945887 B | 10/2022 | |
| CN | 111356125 B | 4/2023 | |
| EP | 0889626 A1 | 1/1999 | |
| EP | 1029402 A1 | 8/2000 | |
| EP | 3179686 A1 * | 6/2017 | ......... H04L 41/5054 |
| EP | 3823215 A1 * | 5/2021 | ........... H04L 43/091 |
| JP | 4593069 B2 | 12/2010 | |
| WO | 1999043111 A1 | 8/1999 | |
| WO | 2009053955 A2 | 4/2009 | |
| WO | WO-2010011682 A1 * | 1/2010 | ............. H04L 41/12 |
| WO | 2011127427 A2 | 10/2011 | |
| WO | WO-2014170545 A1 * | 10/2014 | ............. H04W 8/20 |
| WO | WO-2020108747 A1 * | 6/2020 | ........... H04L 41/147 |

\* cited by examiner

PROVISIONING FLOW TROUBLESHOOTING TOOL

BACKGROUND

In general, troubleshooting is the identification or diagnosis of "trouble" in the management flow of a system caused by a failure of some kind. The problem is initially described as symptoms of malfunction, and troubleshooting is the process of determining and remedying the causes of these symptoms. A system can be described in terms of its expected, desired, or intended behavior (usually, for artificial systems, its purpose). Events or inputs to the system are expected to generate specific results or outputs. (For example, selecting the "print" option from various computer applications is intended to result in a hardcopy emerging from some specific device.) Any unexpected or undesirable behavior is a symptom. Troubleshooting is the process of isolating the specific cause or causes of the symptom. Frequently, the symptom is a failure of the product or process to produce any results. (Nothing was printed, for example.) Corrective action can then be taken to prevent further failures of a similar kind.

BRIEF DESCRIPTION OF THE DRAWINGS

Detailed descriptions of implementations of the present invention will be described and explained through the use of the accompanying drawings.

Figure 1:
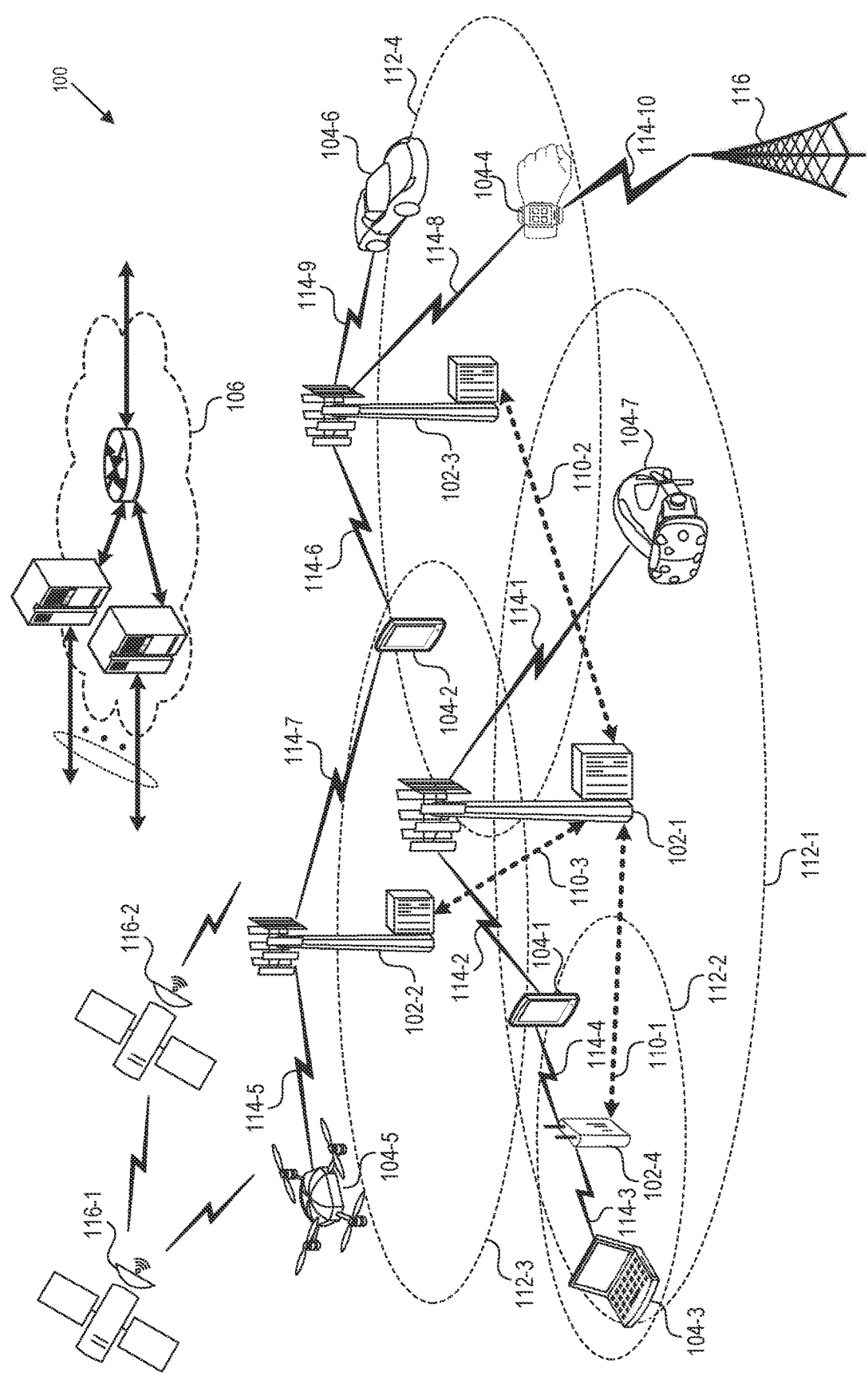
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology relates to a troubleshooting system for determining the effects and type of failure when an error to a provisioning flow order occurs. The system can determine the cause of the failed subscriber segment and the subscriber affected by the failure. Subscriber segments are the services that a subscriber subscribes to, such as data, talk, or text services. For a subscriber segment to function correctly, the subscribed-to services need to follow a specific provisioning flow order on the network. A provisioning flow order is the process of preparing, equipping, and ordering the subscribed-to services of a subscriber segment on a telecommunications network. A proper provisioning flow order allows a subscriber to access the services the subscriber subscribes to. A failed subscriber segment can occur when the provisioning flow order deviates from the expected order, causing an error. For example, a provisioning flow order can be incorrect if there is a missing subscribed-to service, there is an additional subscribed-to service, or the subscribed-to services are ordered improperly. When failures occur, the exact location of the error in the failed subscriber segment needs to be found to determine the cause of the failed subscriber segment and how the subscriber was affected.

The system can first receive a dataset of provisioning flows. The dataset of provisioning flows can train a large language model (LLM) on the proper provisioning flow order of the subscriber segment. For example, the LLM can be a private LLM. In another example, the LLM can be an open LLM. The received dataset of provisioning flows can be generated from both successful and failed subscriber segments. Subscriber segments have a consistent order, meaning that a successful subscriber segment occurs when an expected provisioning flow order occurs, and a failed subscriber segment occurs when an incorrect provisioning flow order occurs. The dataset of provisioning flows can be received in a text format. For example, the dataset of provisioning flows can be received in a portable document format (PDF) and converted to a text format or received directly in a text format. A text format, for example, can include a .TXT file, .LOG file, .MD file, or any other text-based format. The text contained in the text format indicates what provisioning flow order occurred in the subscriber segment for a given subscriber. The system cleans the text in the text format to remove text characters irrelevant to the provisioning flow order. The text cleaning formats and transforms the text into a format capable of training the LLM.

The system can categorize the dataset of provisioning flows. For example, the dataset of provisioning flows can be categorized by successful subscriber segments and failed subscriber segments. The dataset of provisioning flows can also be categorized by type of provisioning flow order, where there is a category for each type of provisioning flow order. The system inputs, as a text format, the cleaned and categorized dataset of provisioning flows into the LLM. For example, when the LLM is a private LLM, the system can train the LLM on the dataset of provisioning flows or similar data. For example, the training allows the LLM to determine the difference between successful and failed subscriber segments. The training allows the LLM to determine errors in the subscriber segments on which it is trained.

The system receives a subscriber segment of an affected subscriber. For example, the subscriber segment can be received because a failure was detected, but the reason for the failure and the identity of the affected subscriber are unknown. The system inputs the received subscriber segment into the LLM. The LLM can perform a root cause analysis of the received subscriber segment. For example, during the root cause analysis, the LLM can analyze the received subscriber segment and compare it to the dataset of provisioning flows. The LLM can determine variations in the provisioning flow order of the received subscriber segment and compare it to the provisioning flow order of successful subscriber segments found within the dataset of provisioning flows. The root cause analysis determines the subscriber affected by the failed subscriber segment and determines the error in the provisioning flow order. The LLM can perform an impact analysis of the received subscriber segment. The impact analysis determines how the failed subscriber segment affected the subscriber. For example, the failed subscriber segment can cause a disruption of the affected subscriber's services, such as a disruption to data or calling services. Additionally, the impact analysis can determine that the subscriber segment had no impact on the affected subscriber's services. As such, network operators can efficiently troubleshoot failed subscriber segments without manually inspecting each provisioning flow order.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QOS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

Transformer for Neural Network

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN may encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification) in order to improve the accuracy of outputs (e.g., more accurate predictions) such as, for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a language model), the training dataset may be a collection of text documents, referred to as a text corpus (or simply referred to as a corpus). The corpus may represent a language domain (e.g., a single language), a subject domain (e.g., scientific papers), and/or may encompass another domain or domains, be they larger or smaller than a single language or subject domain. For example, a relatively large, multilingual and non-subject-specific corpus may be created by extracting text from online webpages and/or publicly available social media posts. Training data may be annotated with ground truth labels (e.g., each data entry in the training dataset may be paired with a label), or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger dataset. For example, a dataset may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters may be determined based on the measured performance of one or more of the trained ML models, and the first step of training (i.e., with the training set) may begin again on a different ML model described by the new set of determined hyperparameters. In this way, these steps may be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger dataset and/or schemes for using the segments for training one or more ML models are possible.

Backpropagation is an algorithm for training an ML model. Backpropagation is used to adjust (also referred to as update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (i.e., "learn") the parameters to reduce the loss function. Backpropagation is performed iteratively so that the loss function is converged or minimized. Other techniques for learning the parameters of the ML model may be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters may then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publically-available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to a ML-based language model, there could exist non-ML language models. In the present disclosure, the term "language model" may be used as shorthand for an ML-based language model (i.e., a language model that is implemented using a neural network or other ML architecture), unless stated otherwise. For example, unless stated otherwise, the "language model" encompasses LLMs.

A language model may use a neural network (typically a DNN) to perform natural language processing (NLP) tasks. A language model may be trained to model how words relate to each other in a textual sequence, based on probabilities. A language model may contain hundreds of thousands of learned parameters or in the case of a large language model (LLM) may contain millions or billions of learned parameters or more. As non-limiting examples, a language model can generate text, translate text, summarize text, answer questions, write code (e.g., Phyton, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

In recent years, there has been interest in a type of neural network architecture, referred to as a transformer, for use as language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

Figure 2:
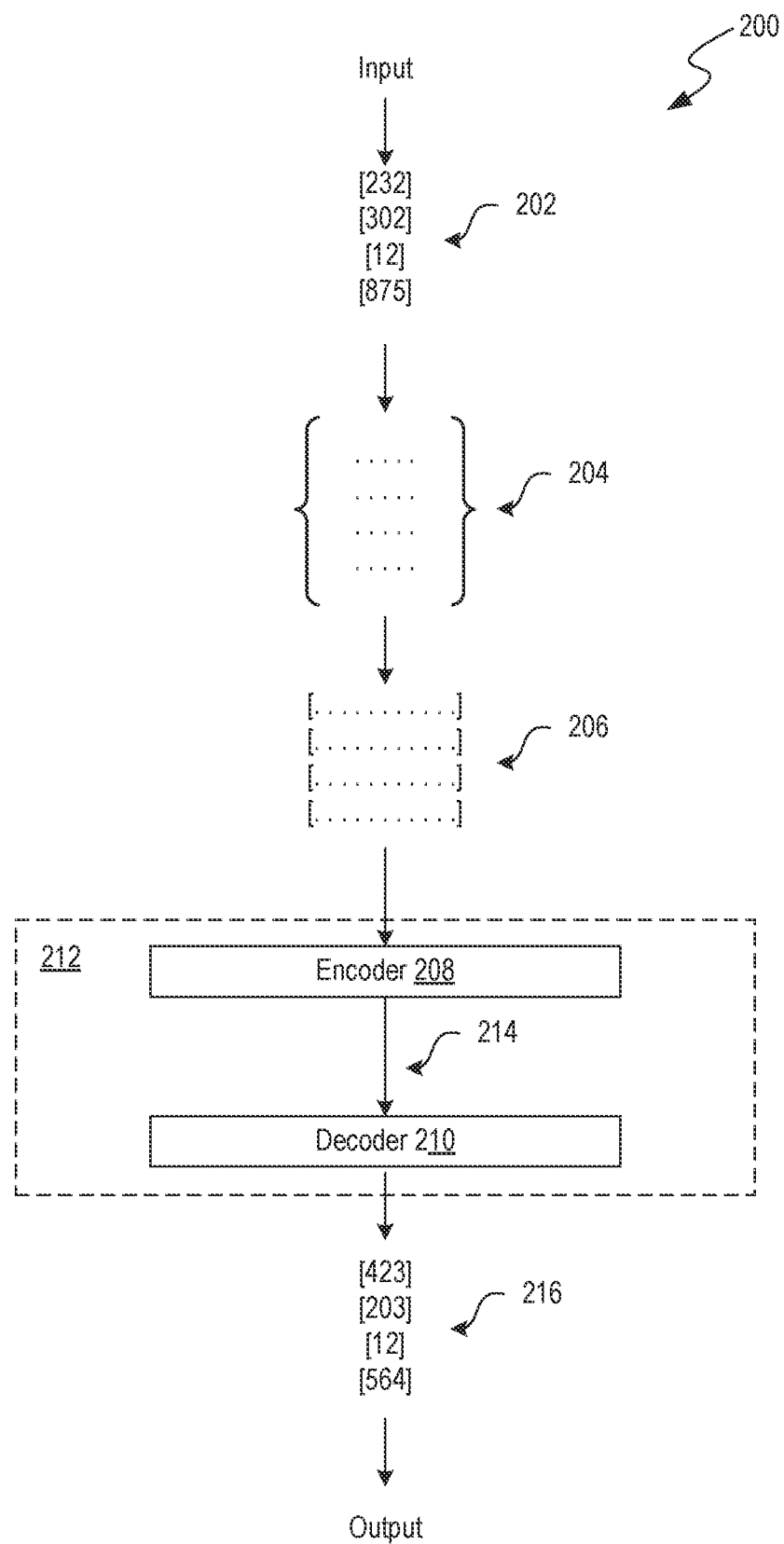
FIG. 2 is a block diagram that illustrates an example transformer.

FIG. 2 is a block diagram of an example transformer 212. A transformer is a type of neural network architecture that uses self-attention mechanisms to generate predicted output based on input data that has some sequential meaning (i.e., the order of the input data is meaningful, which is the case for most text input). Self-attention is a mechanism that relates different positions of a single sequence to compute a representation of the same sequence. Although transformer-based language models are described herein, it should be understood that the present disclosure may be applicable to any machine learning (ML)-based language model, including language models based on other neural network architectures such as recurrent neural network (RNN)-based language models.

The transformer 212 includes an encoder 208 (which can comprise one or more encoder layers/blocks connected in series) and a decoder 210 (which can comprise one or more decoder layers/blocks connected in series). Generally, the encoder 208 and the decoder 210 each include a plurality of neural network layers, at least one of which can be a self-attention layer. The parameters of the neural network layers can be referred to as the parameters of the language model.

The transformer 212 can be trained to perform certain functions on a natural language input. For example, the functions include summarizing existing content, brainstorming ideas, writing a rough draft, fixing spelling and grammar, and translating content. Summarizing can include extracting key points from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some embodiments, the transformer 212 is trained to perform certain functions on other input formats than natural language input. For example, the input can include objects, images, audio content, or video content, or a combination thereof.

The transformer 212 can be trained on a text corpus that is labeled (e.g., annotated to indicate verbs, nouns) or unlabeled. Large language models (LLMs) can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input). FIG. 2 illustrates an example of how the transformer 212 can process textual input data. Input to a language model (whether transformer-based or otherwise) typically is in the form of natural language that can be parsed into tokens. It should be appreciated that the term "token" in the context of language models and natural language processing (NLP) has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some examples, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

In FIG. 2, a short sequence of tokens 202 corresponding to the input text is illustrated as input to the transformer 212. Tokenization of the text sequence into the tokens 202 can be performed by some pre-processing tokenization module such as, for example, a byte-pair encoding tokenizer (the "pre" referring to the tokenization occurring prior to the processing of the tokenized input by the LLM), which is not shown in FIG. 2 for simplicity. In general, the token sequence that is inputted to the transformer 212 can be of any length up to a maximum length defined based on the dimensions of the transformer 212. Each token 202 in the token sequence is converted into an embedding vector 206 (also referred to simply as an embedding 206). An embedding 206 is a learned numerical representation (such as, for example, a vector) of a token that captures some semantic meaning of the text segment represented by the token 202. The embedding 206 represents the text segment corresponding to the token 202 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 206 corresponding to the "write" token will be closer to another embedding corresponding to the "jot down" token in the vector space as compared to the distance between the embedding 206 corresponding to the "write" token and another embedding corresponding to the "summary" token.

The vector space can be defined by the dimensions and values of the embedding vectors. Various techniques can be used to convert a token 202 to an embedding 206. For example, another trained ML model can be used to convert the token 202 into an embedding 206. In particular, another trained ML model can be used to convert the token 202 into an embedding 206 in a way that encodes additional information into the embedding 206 (e.g., a trained ML model can encode positional information about the position of the token 202 in the text sequence into the embedding 206). In some examples, the numerical value of the token 202 can be used to look up the corresponding embedding in an embedding matrix 204 (which can be learned during training of the transformer 212).

The generated embeddings 206 are input into the encoder 208. The encoder 208 serves to encode the embeddings 206 into feature vectors 214 that represent the latent features of the embeddings 206. The encoder 208 can encode positional information (i.e., information about the sequence of the input) in the feature vectors 214. The feature vectors 214 can have very high dimensionality (e.g., on the order of thousands or tens of thousands), with each element in a feature vector 214 corresponding to a respective feature. The numerical weight of each element in a feature vector 214 represents the importance of the corresponding feature. The space of all possible feature vectors 214 that can be generated by the encoder 208 can be referred to as the latent space or feature space.

Conceptually, the decoder 210 is designed to map the features represented by the feature vectors 214 into meaningful output, which can depend on the task that was assigned to the transformer 212. For example, if the transformer 212 is used for a translation task, the decoder 210 can map the feature vectors 214 into text output in a target language different from the language of the original tokens 202. Generally, in a generative language model, the decoder 210 serves to decode the feature vectors 214 into a sequence of tokens. The decoder 210 can generate output tokens 216 one by one. Each output token 216 can be fed back as input to the decoder 210 in order to generate the next output token 216. By feeding back the generated output and applying self-attention, the decoder 210 is able to generate a sequence of output tokens 216 that has sequential meaning (e.g., the resulting output text sequence is understandable as a sentence and obeys grammatical rules). The decoder 210 can generate output tokens 216 until a special [EOT] token (indicating the end of the text) is generated. The resulting sequence of output tokens 216 can then be converted to a text sequence in post-processing. For example, each output token 216 can be an integer number that corresponds to a vocabulary index. By looking up the text segment using the vocabulary index, the text segment corresponding to each output token 216 can be retrieved, the text segments can be concatenated together, and the final output text sequence can be obtained.

In some examples, the input provided to the transformer 212 includes instructions to perform a function on an existing text. In some examples, the input provided to the transformer includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text. For example, the input can include the question "What is the weather like in Australia?" and the output can include a description of the weather in Australia.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as, for example, the Internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ a plurality of processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Inputs to an LLM can be referred to as a prompt, which is a natural language input that includes instructions to the LLM to generate a desired output. A computer system can generate a prompt that is provided as input to the LLM via its API. As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Subscriber Segment Troubleshooting Tool

Figure 3:
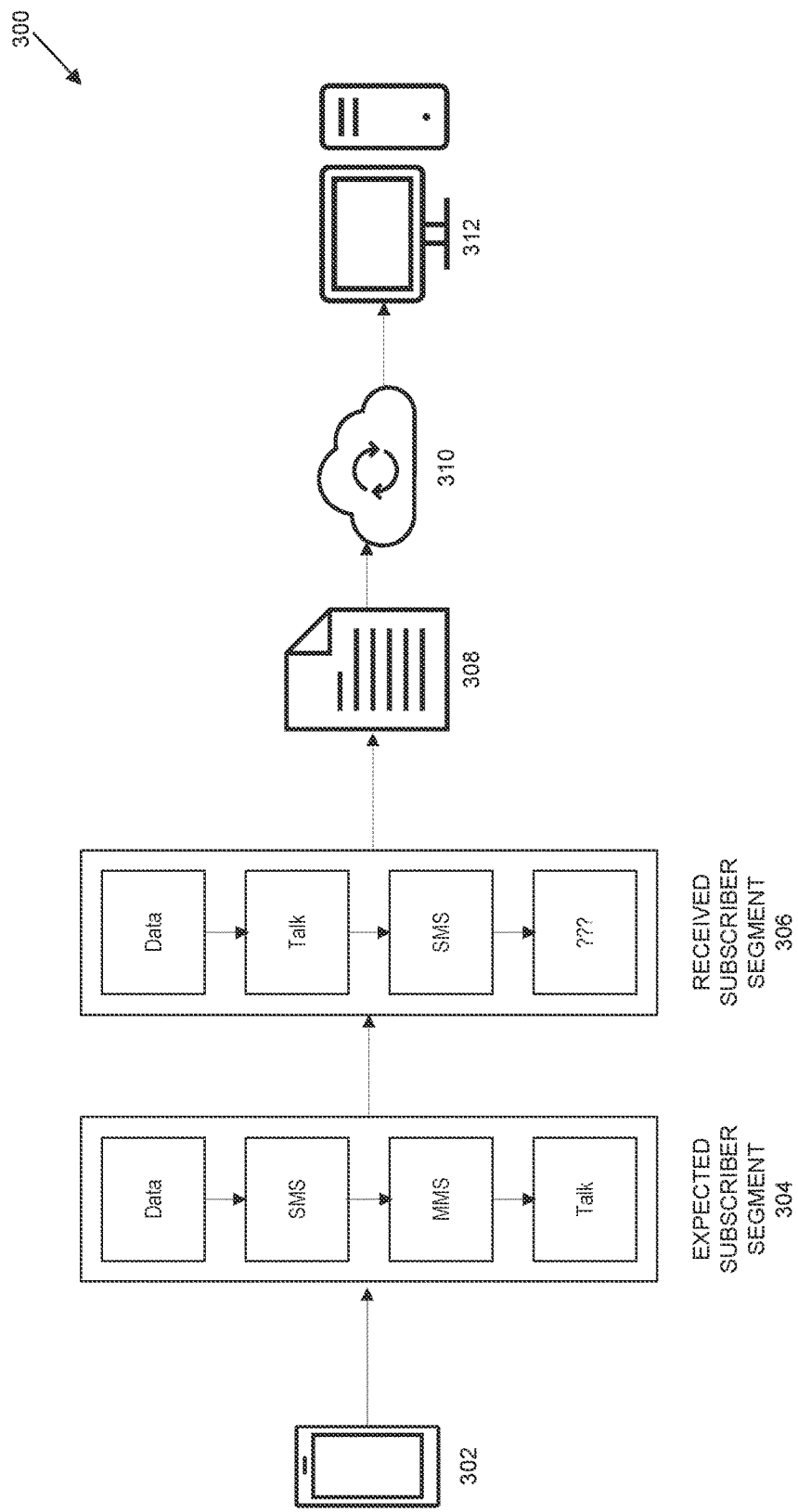
FIG. 3 is a block diagram that illustrates a system configured to perform a process for troubleshooting a failed subscriber segment.

FIG. 3 is a block diagram that illustrates a process 300 for troubleshooting a failed subscriber segment. Wireless device 302 subscribes to a series of services on a telecommunications network. For example, the services can include data, short message service (SMS), multimedia messaging service (MMS), or talk. Wireless device 302 can access the services by accessing a subscriber segment. For example, the subscriber segment can contain all the services subscribed to by wireless device 302. For a subscriber segment to function, the services can have a specific order within the provisioning flow. For example, the order of the provisioning flow of an expected subscriber segment 304 can be data, SMS, MMS, and talk. Wireless device 302 can access the services without error if the expected subscriber segment 304 is accessed.

For example, wireless device 302 can receive a subscriber segment that differs from the expected subscriber segment 304. The received subscriber segment 306 can have a different order of the provisioning flow. For example, the expected subscriber segment 304 can have a provisioning flow order of data, SMS, MMS, and talk. In contrast, the received subscriber segment 306 can have a provisioning flow order of data, talk, SMS. The received subscriber segment 306 contains an error due to the missing MMS service and the misordered services where the talk service is not in the right position within the order. When an order of the provisioning flow differs from the expected order of the provisioning flow, an error can occur, causing the subscriber segment to be a failed subscriber segment. For example, the error can cause a disruption to the services that wireless device 302 subscribes to.

When an error occurs, the error can be troubleshooted to determine what the error was, what caused the error, how wireless device 302 was affected, and which wireless device 302 was affected. The received subscriber segment 306 is received in a text format 308. For example, the text format can be any text-based format that can be inputted into LLM 310. Before the text format 308 is inputted into the LLM 310, the text format can be cleaned to remove unnecessary characters and be transformed into a coded text that can be inputted into the LLM 310. The text format 308 is inputted into the LLM 310. The LLM 310 can cause, as an output on computing device 312, a root cause analysis of the received subscriber segment 306, which is a failed subscriber segment. For example, the root cause analysis can determine the error in the order of the provisioning flow or the identity of wireless device 302. In another example, the LLM 310 can cause as an output on computing device 312 an impact analysis of the received subscriber segment 306. The impact analysis can determine how wireless device 302 was affected by the failed subscriber segment.

Figure 4:
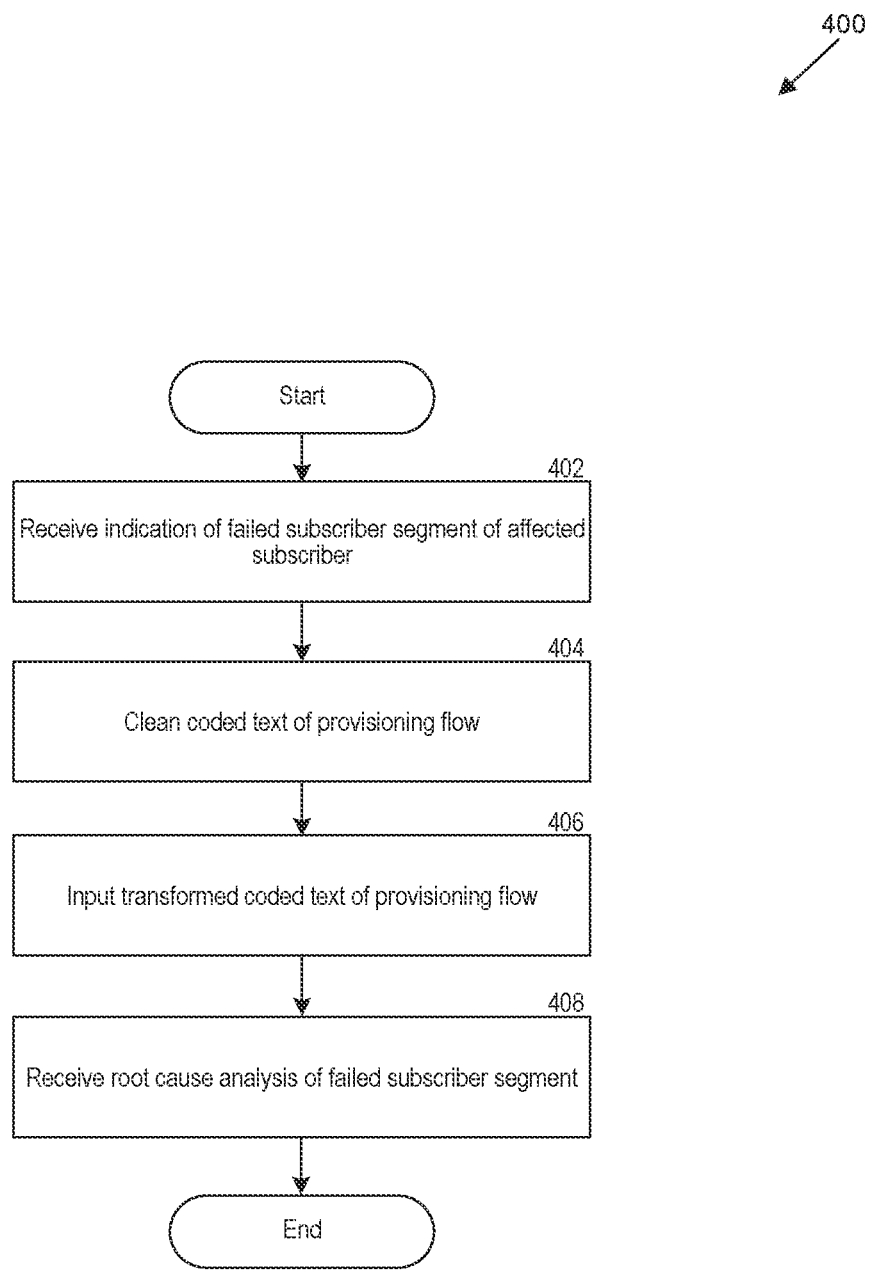
FIG. 4 is a flowchart that illustrates a process for troubleshooting an error in the order of a provisioning flow of a failed subscriber segment.

FIG. 4 is a flowchart that illustrates a process 400 for troubleshooting an error in the order of a provisioning flow of a failed subscriber segment. In one example, a system includes at least one hardware processor and at least one non-transitory memory storing instructions, which, when executed by the at least one hardware processor, cause the system to perform the process 400.

At 402, the system can receive an indication of a failed subscriber segment of an affected subscriber. The subscriber segment includes services subscribed to by the affected subscriber. The subscriber segment has a provisioning flow order that determines an order in which the services subscribed to by the affected subscriber are provisioned. The failed subscriber segment includes an error in the order of the provisioning flow. The provisioning flow of the failed subscriber segment is coded in a text format. In one example, the error in the order of the provisioning flow includes a missing element in the order of the provisioning flow, an additional element in the order of the provisioning flow, or improper ordering in the order of the provisioning flow. In another example, the system can receive a description of the order of the provisioning flow of the subscriber segment in a portable document format (PDF) and convert the description from the PDF to the coded text format. In one example, the failed subscriber segment is generated based on a single subscriber's actions.

In one example, the system can receive a dataset of provisioning flows, where the dataset of provisioning flows includes indications of successful and failed subscriber segments. The system can clean the coded text of the dataset of provisioning flows. The system can categorize the dataset of provisioning flows based on a type of provisioning flow and an indication of successful or failed subscriber segment. The system can train a large language model (LLM) based on the cleaned dataset of provisioning flows. In another example, the LLM is trained using natural language and structured data coding the subscriber segment.

At 404, the system can clean the coded text of the provisioning flow, where cleaning the coded text of the provisioning flow includes removing predetermined unnecessary characters and transforming the coded text such that the transformed coded text is configured to be inputted into the LLM. In one example, the provisioning flow includes subscriber-identifying information, and the system can perform a tokenization process of the provisioning flow. The subscriber-identifying information is removed by the tokenization process, and the tokenization occurs before the provisioning flow is input into the LLM. The system can input the tokenized provisioning flow into the LLM. The system can receive, as a first output of the LLM, a root cause analysis of the tokenized provisioning flow. The system can receive, as a second output of the LLM, an impact analysis of the tokenized provisioning flow. At 406, the system can input the transformed coded text of the provisioning flow into the LLM.

At 408, the system can receive, as an output of the LLM, a root cause analysis of the failed subscriber segment. The root cause analysis determines the error in the order of the provisioning flow of the subscriber segment and identifies the affected subscriber. In one example, the system can receive, as another output of the LLM, an impact analysis of the failed subscriber segment, where the impact analysis determines how the failed subscriber segment affected the subscriber. In one example, there are multiple failed subscriber segments of the affected subscriber, and the system can receive, as a first output of the LLM, the root cause analysis for each of the multiple failed subscriber segments. The system can receive, as a second output of the LLM, an impact analysis for each of the multiple failed subscriber segments. In another example, the system can analyze the root cause analysis and the impact analysis performed by the LLM. The system can generate, based on the analysis of the root cause analysis and the impact analysis, a solution to fix the failed subscriber segment.

Computer System

Figure 5:
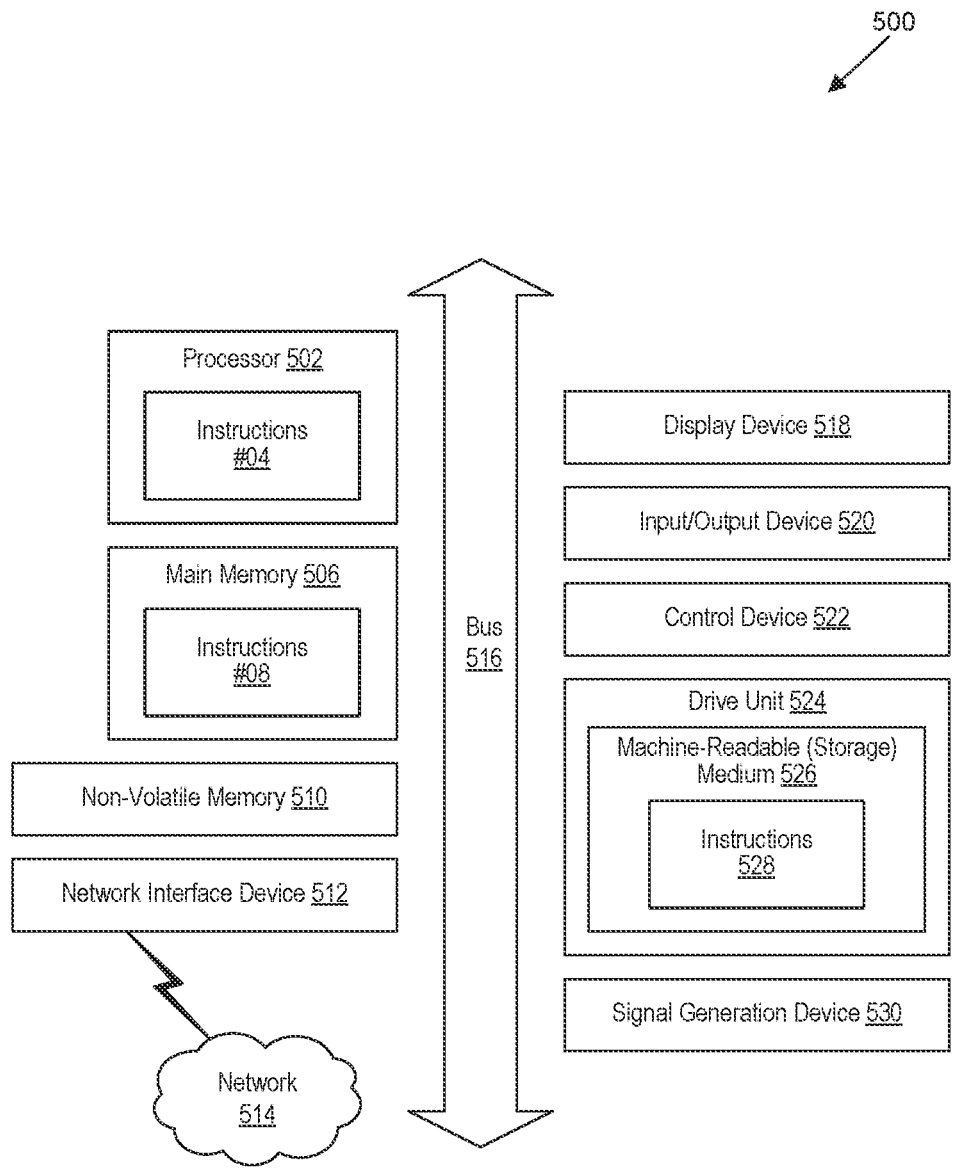
FIG. 5 is a block diagram that illustrates components of a computing device.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, a video display device 518, an input/output device 520, a control device 522 (e.g., keyboard and pointing device), a drive unit 524 that includes a machine-readable (storage) medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementations, the computer system 500 can be an embedded computer system, a system-on-chip (SOC), a single-board computer system (SBC), or a distributed system such as a mesh of computer systems, or it can include one or more cloud components in one or more networks. Where appropriate, one or more computer systems 500 can perform operations in real time, in near real time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

I claim:

1. A system comprising:
   at least one hardware processor; and
   at least one non-transitory memory storing instructions, which, when executed by the at least one hardware processor, cause the system to:
      receive an indication of a failed subscriber segment of an affected subscriber,
         wherein a subscriber segment includes services subscribed to by the affected subscriber,
         wherein the subscriber segment has an order of a provisioning flow that determines an order in which the services subscribed to by the affected subscriber are provisioned,
         wherein the failed subscriber segment includes an error in the order of the provisioning flow, and
         wherein the provisioning flow of the failed subscriber segment is coded in a text format;
      clean the coded text of the provisioning flow,
         wherein cleaning the coded text of the provisioning flow includes removing predetermined unnecessary characters and transforming the coded text such that the transformed coded text is configured to be inputted into a large language model (LLM);
      input the transformed coded text of the provisioning flow into the LLM; and
      receive, as an output of the LLM, a root cause analysis of the failed subscriber segment,
         wherein the root cause analysis determines the error in the order of the provisioning flow of the failed subscriber segment, and
         wherein the root cause analysis identifies the affected subscriber.

2. The system of claim 1, further caused to:
   receive, as another output of the LLM, an impact analysis of the failed subscriber segment,
      wherein the impact analysis determines how the failed subscriber segment affected the subscriber.

3. The system of claim 1, wherein the error in the order of the provisioning flow includes:
   a missing element in the order of the provisioning flow,
   an additional element in the order of the provisioning flow, or
   an improper order in the order of the provisioning flow.

4. The system of claim 1, further caused to:
   receive a dataset of provisioning flows,
      wherein the dataset of provisioning flows includes indications of successful and failed subscriber segments;
   clean a coded text of the dataset of provisioning flows;
   categorize the dataset of provisioning flows based on a type of provisioning flow and an indication of successful or failed subscriber segment; and
   train the LLM based on the dataset of provisioning flows.

5. The system of claim 1, wherein there are multiple failed subscriber segments of the affected subscriber, and wherein the system is further caused to:
   receive, as a first output of the LLM, a root cause analysis for each of the multiple failed subscriber segments; and
   receive, as a second output of the LLM, an impact analysis for each of the multiple failed subscriber segments.

6. The system of claim 1, wherein receiving the indication of the failed subscriber segment comprises further causing the system to:
   receive a description of the order of the provisioning flow of the failed subscriber segment in a portable document format (PDF); and
   convert the description from the PDF to the coded text format.

7. The system of claim 1, further caused to:
   analyze the root cause analysis and the impact analysis output by the LLM; and
   generate, based on the analysis of the root cause analysis and the impact analysis, a solution to fix the failed subscriber segment.

8. The system of claim 1, wherein the failed subscriber segment is generated based on at least one action of a single subscriber.

9. The system of claim 1, wherein the provisioning flow includes subscriber-identifying information, and wherein the system is further caused to:
   perform a tokenization process of the provisioning flow,
      wherein the subscriber-identifying information is removed by the tokenization process, and wherein the tokenization process occurs before the provisioning flow is input into the LLM;
input the tokenized provisioning flow into the LLM;
receive, as a first output of the LLM, a root cause analysis of the tokenized provisioning flow; and
receive, as a second output of the LLM, an impact analysis of the tokenized provisioning flow.

10. The system of claim 1, wherein the LLM is trained using natural language and structured data coding the failed subscriber segment.

11. A non-transitory, computer-readable storage medium comprising instructions recorded thereon, wherein the instructions, when executed by at least one data processor of a system, cause the system to:
receive an indication of a failed subscriber segment of an affected subscriber,
wherein a subscriber segment includes services subscribed to by the affected subscriber,
wherein the subscriber segment has an order of a provisioning flow that determines an order in which the services subscribed to by the affected subscriber are provisioned,
wherein the failed subscriber segment includes an error in the order of the provisioning flow, and
wherein the provisioning flow of the failed subscriber segment is coded in a text format;
clean the coded text of the provisioning flow,
wherein cleaning the coded text of the provisioning flow includes removing predetermined unnecessary characters and transforming the coded text such that the transformed coded text is configured to be inputted into a large language model (LLM);
input the transformed coded text of the provisioning flow into the LLM; and
receive, as an output of the LLM, a root cause analysis of the failed subscriber segment,
wherein the root cause analysis determines the error in the order of the provisioning flow of the failed subscriber segment, and
wherein the root cause analysis identifies the affected subscriber.

12. The computer-readable storage medium of claim 11, the instructions further causing the system to:
receive a dataset of provisioning flows,
wherein the dataset of provisioning flows includes indications of successful and failed subscriber segments;
clean the coded text of the dataset of provisioning flows;
categorize the dataset of provisioning flows based on a type of provisioning flow and an indication of successful or failed subscriber segment; and
train the LLM based on the dataset of provisioning flows.

13. The computer-readable storage medium of claim 11, the instructions further causing the system to:
receive, as another output of the LLM, an impact analysis of the failed subscriber segment,
wherein the impact analysis determines how the failed subscriber segment affected the subscriber.

14. The computer-readable storage medium of claim 11, wherein the LLM is trained using natural language and structured data coding the failed subscriber segment.

15. The computer-readable storage medium of claim 11, wherein the failed subscriber segment is generated from actions of a single subscriber.

16. A method comprising:
receiving an indication of a failed subscriber segment of an affected subscriber,
wherein a subscriber segment includes services subscribed to by the affected subscriber,
wherein the subscriber segment has an order of a provisioning flow that determines an order in which the services subscribed to by the affected subscriber are provisioned,
wherein the failed subscriber segment includes an error in the order of the provisioning flow, and
wherein the provisioning flow of the failed subscriber segment is coded in a text format;
cleaning the coded text of the provisioning flow,
wherein cleaning the coded text of the provisioning flow includes removing predetermined unnecessary characters and transforming the coded text such that the transformed coded text is configured to be inputted into a large language model (LLM);
inputting the transformed coded text of the provisioning flow into the LLM; and
receiving, as an output of the LLM, a root cause analysis of the failed subscriber segment,
wherein the root cause analysis determines the error in the order of the provisioning flow of the failed subscriber segment, and
wherein the root cause analysis identifies the affected subscriber.

17. The method of claim 16, further comprising:
receiving, as another output of the LLM, an impact analysis of the failed subscriber segment,
wherein the impact analysis determines how the failed subscriber segment affected the subscriber.

18. The method of claim 16, wherein there are multiple failed subscriber segments of the affected subscriber, the method further comprising:
receiving, as a first output of the LLM, a root cause analysis for each of the multiple failed subscriber segments; and
receiving, as a second output of the LLM, an impact analysis for each of the multiple failed subscriber segments.

19. The method of claim 16, wherein the provisioning flow includes subscriber-identifying information, the method further comprising:
performing a tokenization process of the provisioning flow,
wherein the subscriber-identifying information is removed by the tokenization process, and
wherein the tokenization process occurs before the provisioning flow is input into the LLM;
inputting the tokenized provisioning flow into the LLM;
receiving, as a first output of the LLM, a root cause analysis of the tokenized provisioning flow; and
receiving, as a second output of the LLM, an impact analysis of the tokenized provisioning flow.

20. The method of claim 16, wherein receiving the indication of the failed subscriber segment comprises:
receiving a description of the order of the provisioning flow of the failed subscriber segment in a portable document format (PDF); and
converting the description from the PDF to the coded text format.

* * * * *